United States Patent [19]

Raj et al.

[11] Patent Number: 5,636,547

[45] Date of Patent: Jun. 10, 1997

[54] LIQUID LEVEL MONITORING SYSTEM HAVING FERROFLUID PRESSURE SENSOR

[75] Inventors: Kuldip Raj, Merrimac, N.H.; Jay Greyson, Richfield, Ohio; Christian Ionescu, Nashua, N.H.

[73] Assignee: Ferrofluidics Corporation, Nashua, N.H.

[21] Appl. No.: 346,576

[22] Filed: Nov. 29, 1994

[51] Int. Cl.⁶ .................................................. G01L 9/00
[52] U.S. Cl. ......................................... 73/299; 73/749
[58] Field of Search ........................... 73/747, 748, 749, 73/750, 299

[56] References Cited

U.S. PATENT DOCUMENTS

| | | | |
|---|---|---|---|
| 2,758,476 | 8/1956 | Donald et al. | 73/750 |
| 3,103,821 | 9/1963 | Wright | 73/750 |
| 3,215,190 | 11/1965 | Svanoe | 73/299 |
| 3,398,394 | 8/1968 | Luehrmann et al. | 73/299 |
| 3,573,784 | 4/1971 | Backofer et al. | 340/258 |
| 3,665,209 | 5/1972 | Webb et al. | 307/118 |
| 3,751,185 | 8/1973 | Gottliebson et al. | 417/7 |
| 3,803,917 | 4/1974 | Reese et al. | 73/708 |
| 3,947,692 | 3/1976 | Payne | 250/577 |
| 4,265,110 | 5/1981 | Moulin | 73/151 |
| 4,380,933 | 4/1983 | Irvin | 73/749 |
| 4,462,259 | 7/1984 | Stoltman et al. | 73/749 |
| 4,739,663 | 4/1988 | Peterson et al. | 73/703 |
| 4,782,704 | 11/1988 | Webb | 73/749 |
| 5,249,000 | 9/1993 | Raj et al. | 73/749 |

FOREIGN PATENT DOCUMENTS

| | | | |
|---|---|---|---|
| 8501444A | 12/1986 | Netherlands | 73/748 |
| 838376 | 6/1981 | U.S.S.R. | 73/299 |

OTHER PUBLICATIONS

Lathi, B.P.; Modern Digital and Analog Communication Systems (New York, Holt, Rinehart and Winston); pp. 214–216. (1983).

Primary Examiner—Richard Chilcot
Assistant Examiner—Paul D. Amrorwicz
Attorney, Agent, or Firm—Bookstein & Kudirka, P.C.

[57] ABSTRACT

A liquid level monitoring system, which monitors the level of liquid in a storage tank, includes a differential pressure sensor that uses a magnetic fluid, or ferrofluid, sensing element. The pressure sensor is U-shaped with a first one leg connected, via a first pressure chamber, to a bubbler tube that extends downwardly into the storage tank. The second leg of the U-shaped sensor connects to a second pressure chamber, which applies to the second leg a selected, fixed pressure. The pressure applied to the first leg of the sensor is proportional to the hydrostatic back pressure in the bubbler tube, which varies directly with the level of liquid in the storage tank. Wound around the legs of the pressure sensor are inductance coils. The inductances of these coils change as the ferrofluid sensing element moves within the sensor. Accordingly, the inductances change as the level of liquid in the storage tank varies. The inductor coils are connected to a control system which produces a control signal based on the differences of the inductances. This control signal thus varies essentially continuously with changes in the level of liquid in the storage tank. The control signal is preferably used to control a storage tank control system which includes various pumps. In response to the control signal, the pumps force liquid into or out of the storage tank, as appropriate. Alternatively, an array of sensing elements may be used to determine the position of the ferrofluid. Signals from the various sensing elements in the array are essentially encoded to produce an output signal that corresponds to the level of fluid in the storage tank.

27 Claims, 4 Drawing Sheets

LIQUID LEVEL MONITORING SYSTEM HAVING FERROFLUID PRESSURE SENSOR

FIELD OF THE INVENTION

The invention relates to differential pressure sensors and, in particular, to pressure sensors utilizing ferrofluid as a sensing element.

BACKGROUND OF THE INVENTION

Pressure sensors are often included in systems that measure the levels of liquids in storage tanks. These sensors are common in water treatment plants, water supply systems and so forth. One such system is described in U.S. Pat. No. 4,380,933 to Irvin. A mercury manometer is connected along with a pump to a bubbler tube in the storage tank. The pump forces air into the bubbler tube to force liquid from the tube. When all the liquid is forced from the tube, the back pressure in the tube is proportional to the height of the displaced liquid. This pressure is sensed by the manometer, which can be calibrated in terms of the level of liquid in the storage tank.

Mercury is a hazardous substance. Accordingly, the Irvin system contains special filters and reservoirs to prevent the mercury from leaking out of the system. This is particularly important if the system is used to control the water level in the storage tank of a water supply system. However, even with these filters and reservoirs, the mercury may still leak. For example, a well of the manometer may crack and mercury may then flow through the crack, to contaminate the environment or nearby workers. Thus, it is desirable to utilize some substance other than mercury as a sensing element in such a system.

The Irvin system includes various electrical contacts positioned along the manometer to produce control signals. When the mercury in the manometer reaches a contact it immerses, and thus, closes an electrical circuit to produce an associated control signal. This signal turns on a pump that forces liquid from the tank. As the level of liquid in the tank falls, the mercury level in the manometer also falls, until the mercury no longer covers the contact. The circuit thus opens and the pump shuts off.

This feature of the Irvin control system works well for storage systems that do not require precise control of the level of liquid in the storage tank. This system produces various control signals that correspond to specific levels of mercury, and thus, to specific levels of liquid in the tank. Accordingly, the system does not provide continuously varying control signals. Further, each control signal corresponds with the position of a fixed contact. Thus the system is impracticable for use in situations where one might want to change the liquid level corresponding to a particular control signal. For more precise control of the liquid level, what is needed is a system that produces a control signal that responds essentially continuously to changes in the level of liquid in the storage tank.

SUMMARY OF THE INVENTION

A liquid level monitoring system incorporating the invention uses a differential pressure sensor in which the working fluid is a magnetic liquid, or ferrofluid. This sensor is U-shaped with a first leg connected, via a first pressure chamber, to a bubbler tube that extends downward into the tank containing the monitored liquid. The second leg of the sensor is connected to a second pressure chamber that is maintained at a predetermined pressure. Each leg of the sensor is surrounded by windings of an inductance coil. As the level of the liquid in the storage tank changes, the associated pressure in the first chamber, and thus, the pressure on one end of the ferrofluid element, changes. In response, the ferrofluid element moves and the level of the ferrofluid in each of the legs thus changes. Accordingly, the inductance of each of the coils wound around the legs changes, the ferrofluid element acting essentially as a movable core. The coils are preferably connected to a circuit which produces a control signal that corresponds to the difference between the inductances of the two coils. This signal is directly proportional to the level of liquid in the storage tank.

The second pressure chamber may be connected to a pressure regulator, which provides a fixed, but adjustable reference pressure. The pressure in this second chamber sets the range of the sensor. Ferrofluid has a density of appropriately 1 g/cc, and slight changes in the pressure in the first pressure chamber result in a rather large displacements of the ferrofluid element. Accordingly, the pressure in the second chamber is preferably adjusted to correspond to a desired level of the liquid in the tank. If the liquid varies even slightly from this desired level, the change in pressure in the first chamber causes the ferrofluid element to move.

Regardless of the range of operation of the ferrofluid sensor, it produces a control signal that responds essentially continuously to changes in the level of liquid in the storage tank. The current system thus is not constrained to producing changing control signals only when the level of the liquid in the tank varies sufficiently to cause the sensing element to rise above or fall below specific fixed contacts embedded in the path through which the sensing element moves.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
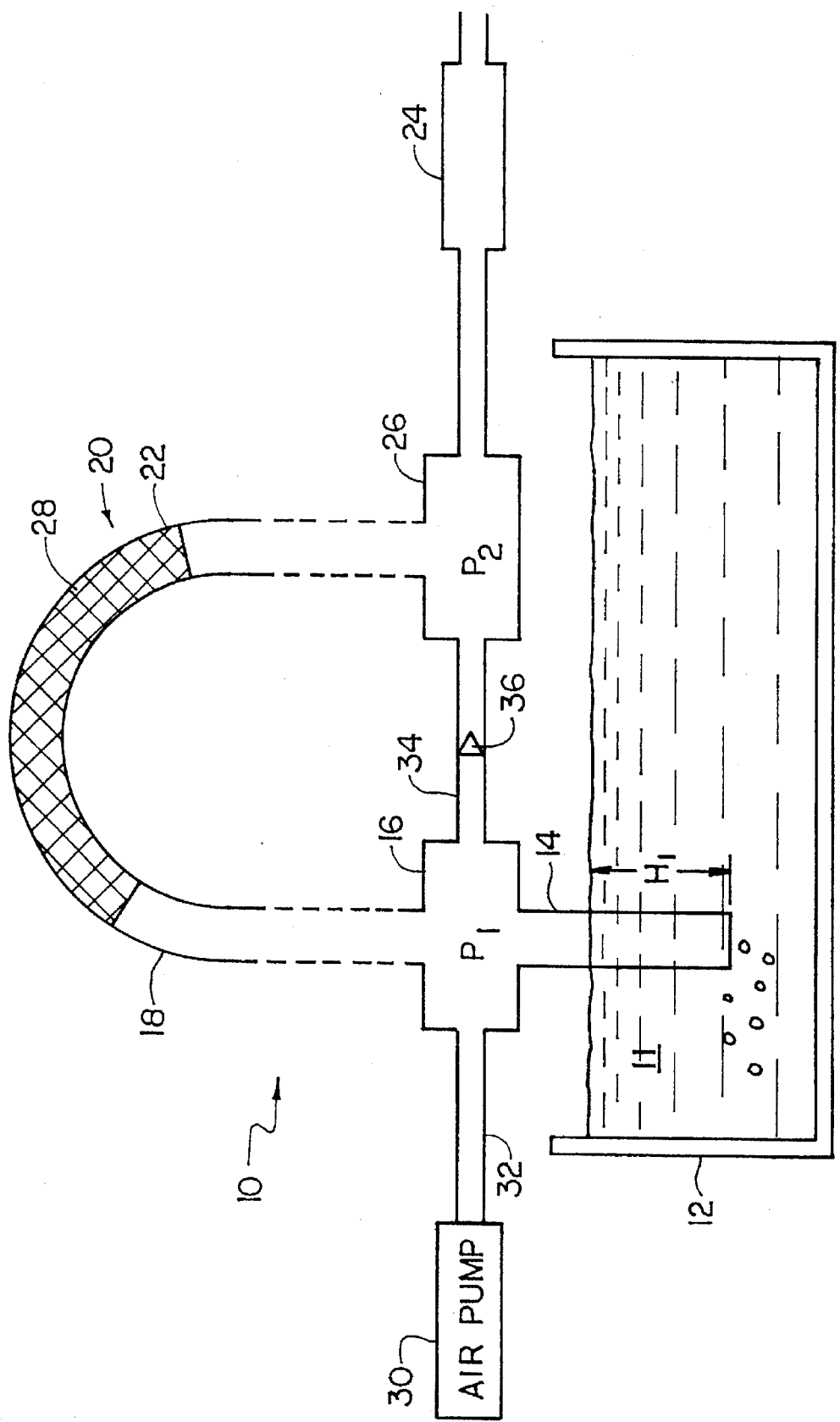
FIG. 1 depicts a pressure sensing system constructed in accordance with a first embodiment.
Figure 2:
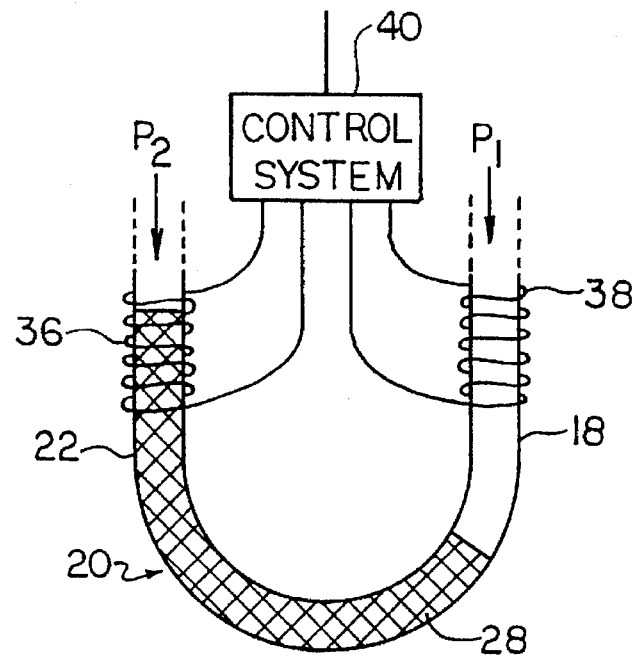
FIG. 2 depicts in more detail a pressure sensor included in the system of FIG. 1.

FIG. 1 depicts a liquid level monitoring system 10, which senses the level of a liquid 11 in a storage tank 12. The system 10 includes a bubbler tube 14 that connects, via a first pressure chamber 16, to a first leg 18 of a U-shaped pressure sensor 20. The pressure sensor 20 is depicted schematically in the drawing. The legs of the sensor 20 actually point upwardly, as depicted in FIG. 2, and connect to the pressure chambers through tubes (not shown). A pressure regulator 24 connects, via a second pressure chamber 26, to a second leg 22 of the U-shaped pressure sensor 20. The sensor 20 contains a ferrofluid sensing element 28 that moves through the sensor 20 in response to pressure differences between the first and second pressure chambers 16 and 26. The pressure sensor 20 is described in more detail below with reference to FIG. 2.

An air pump 30 connects to the first pressure chamber 16 through a pipe 32. The air pump 30 forces air into the chamber and through the chamber into the bubbler tube 14, to force the liquid 11 from the bubbler tube 14. The pressure, $P_1$, in the pressure chamber 16 is equal to the hydrostatic back pressure in the tube, which is equal to the length, $H_1$, of the tube that would otherwise be occupied by the liquid 11. The chamber 16 has a cross-section that is sufficiently larger than the diameter of the pipe 32, such that it smooths the pressure pulses produced by the pump 30.

The first pressure chamber 16 also connects to the second pressure chamber 26 through a pipe 34. This pipe contains a throttle 36, which essentially decouples the two chambers 16 and 26. The pressure regulator 24 maintains a selected, predetermined pressure, $P_2$, in the second pressure chamber 26, and thus, in the second leg 22 of the pressure sensor 20. The pressure regulator 24 is preferably adjusted to maintain a pressure in the second chamber that corresponds to a desired level of liquid 11 in the storage tank 12. The pressure regulator is adjustable, and thus, the pressure in the second pressure chamber can be set to correspond to any level of liquid in the tank.

When the pressures in the first and second pressure chambers are equal, which indicates that the liquid is at the desired level, the ferrofluid sensing element 28 is centered in the U-shaped sensor. The element thus extends equally into each of the legs 18 and 22 of the sensor. When the pressure in the first chamber 16 is larger than the pressure in the second chamber 26, indicating a rise in the level of liquid in the storage tank above the desired level, the ferrofluid element 28 is displaced such that it extends further along the second leg 22 than it does along the first leg 18. The ferrofluid element 28 moves in an opposite direction when the pressure in the first chamber 16 exceeds the pressure in the second chamber 26 by a smaller amount, indicating a lower level of liquid in the tank.

Referring now also to FIG. 2, inductance coils 36 and 38 wind around the legs 18 and 22 of the pressure sensor 20. As the ferrofluid element moves through the sensor in response to changes in the pressure in the first pressure chamber, i.e., in response to changes in the level of liquid 11 in the storage tank 12, the inductances of the coils 36 and 38 change. These coils are connected to a control system 40, that produces a control signal which is directly proportional to a difference in the inductances. The control signal is thus directly proportional to the level of the liquid in the storage tank, and varies continuously with changes in that level. More precisely, the control signal is proportional to the height, $H_1$, of the liquid 11 that would otherwise occupy the bubbler tube 14, which is directly proportional to the pressure in the first chamber 16.

If the level of liquid in the tank varies, even slightly, the corresponding change in pressure in the first chamber 16 displaces the ferrofluid element. This changes the inductances of the coils 36 and 38, and thus, produces a corresponding change in the control signal. This is to be contrasted with known prior systems, which use fixed contacts to produce various control signals. These systems respond only to changes in the liquid level, and thus, changes in the position of the sensing element, that are large enough to immerse or reveal one or more of the contacts. Further, the response of the prior system, like the contacts, is fixed. The system 10 is adjustable. By adjusting the pressure regulator, a user sets the range of the system, and thus, the response to the system to changes in the level of the liquid from a selected level.

Figure 3:
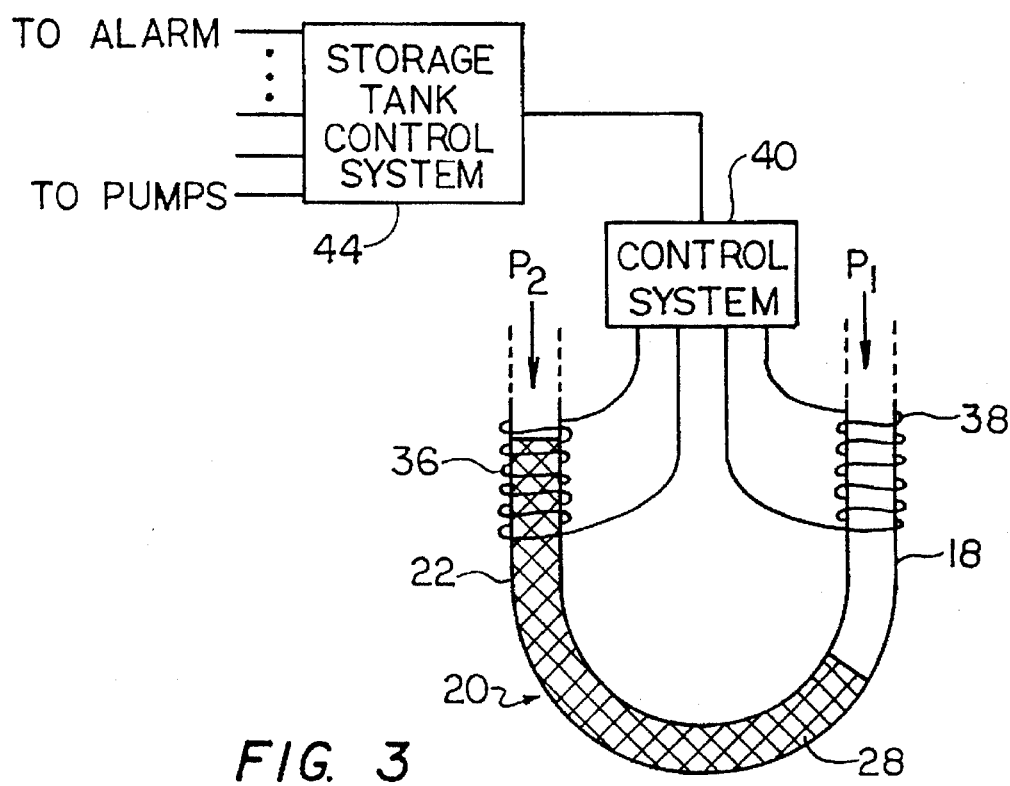
FIG. 3 depicts a pressure sensing system constructed in accordance with a second embodiment.

FIG. 3 depicts the sensor 20, a control system 40 and a storage tank control system 44 for use with the sensing system 10. The storage tank control system receives the control signal produced by control system 40 and responds to it by opening and/or closing various switches to control one or more liquid pumps (not shown). These pumps then force liquid into or out of the storage tank, as appropriate. The storage tank control system 44 may also connect to an alarm (not shown), that responds to a control signal that is indicative of an extremely high or low liquid level, as appropriate.

Figure 4:
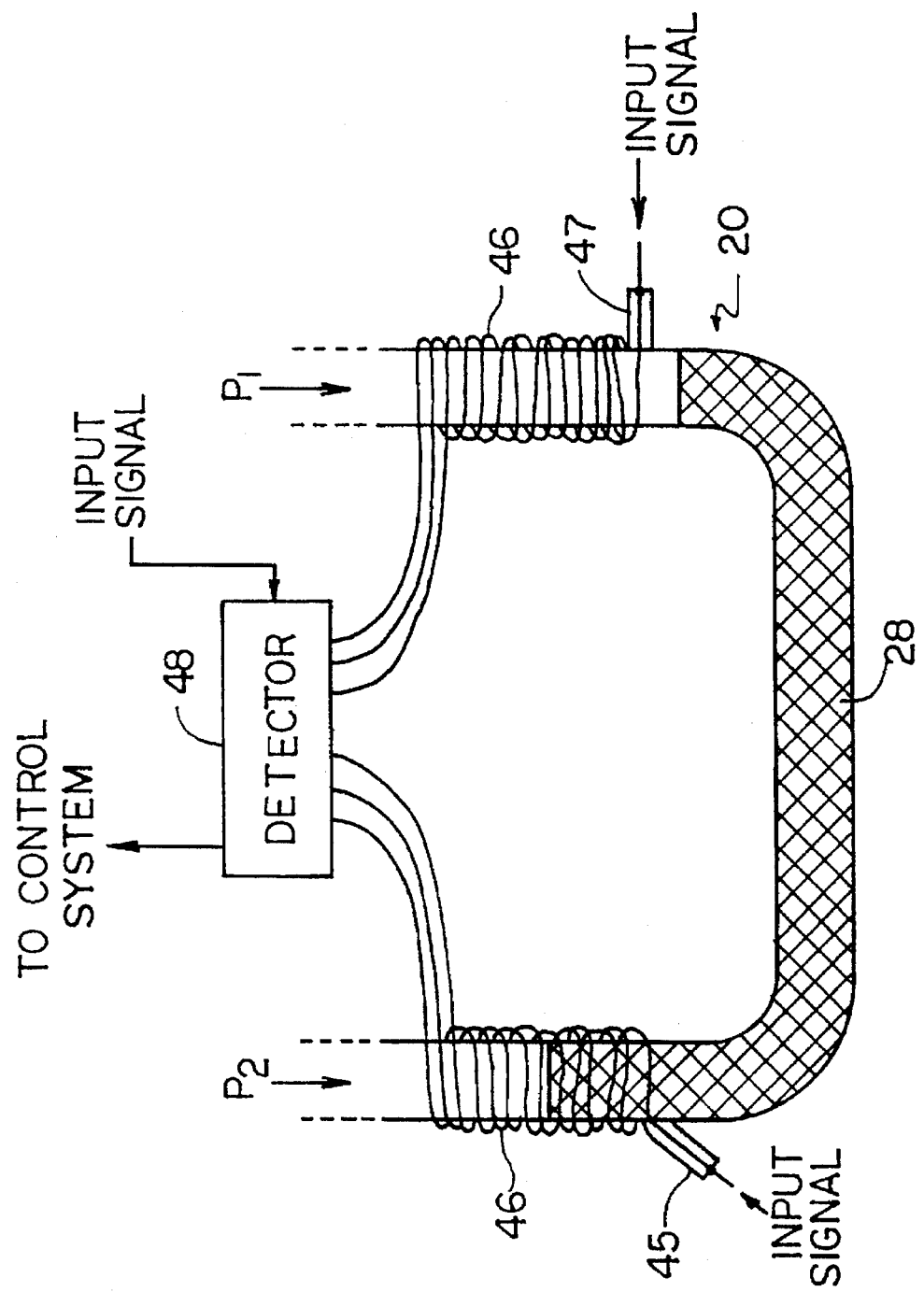
FIG. 4 depicts an alternative embodiment of the pressure sensing system of FIG. 1, including overlaid coils.

FIG. 4 depicts the pressure sensor with multiple, overlapping coils 46 on the legs 18 and 22. At their input ends, 45 and 47, the coils are connected together and input signals are applied from a suitable AC signal source (not shown) in a conventional manner. The output signals produced by each of these coils are applied to an asynchronous detector 48. This detector also receives the same input signal as the coils, and filters out signals received from the coils that are the same frequency as the input signal. The detector thus avoids processing noise signals that the coils pick up from the surrounding environment. Shielding (not shown) may also be added to the sensor, to reduce these signals.

The detector, which operates in a conventional manner, essentially processes received signals that are the same frequency, but a different phase, as the input signals and produces a digital output signal that corresponds to the position of the ferrofluid sensing element 28. Since the overlaid coils produce signals that vary essentially continuously with changes in the position of the ferrofluid sensing element 28, the detector produces a digital signal that varies with any change to the fluid level.

Figure 5:
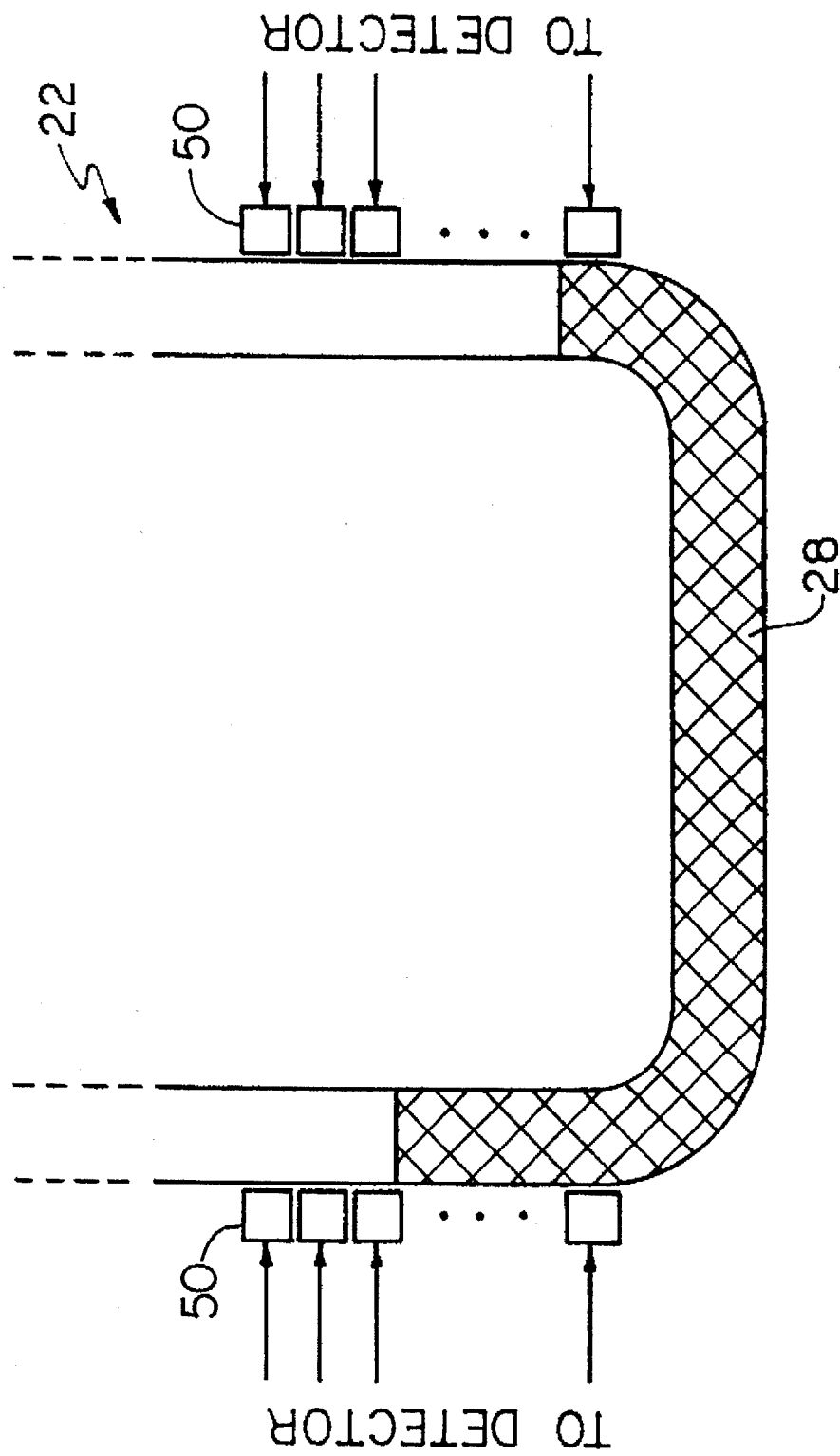
FIG. 5 depicts a second alternative embodiment of the pressure sensing system of FIG. 1, including an array of sensing elements.

FIG. 5 depicts a pressure sensor with an array of sensing elements 50 along each of the legs 18 and 22. In one embodiment, these sensing elements 50 are conventional Hall effect detectors, which sense a change in magnetic field as the ferrofluid sensing element changes position. The sensing elements 50 may also be optical sensing elements, which sense changes in transmitted light as the ferrofluid sensing element 28 moves past them. The coverage of these adjacent sensing elements is essentially continuous, since the signals produced by each element 50 vary as the ferrofluid sensing element 28 moves past it. This is in contrast with prior known sensors, with elements that turn on or off as the ferrofluid element reaches or recedes from them. The signals from the sensing elements 50 may be combined to produce an analog output signal as described above, or they may be applied to the asynchronous detector 48 (FIG. 4), which produces a corresponding digital output signal.

The sensing elements 50 may also be capacitive elements, whose capacitance varies with the position of the ferrofluid sensing element 28. The signals produced by these capacitive elements are applied to the detector 48, to produce a digital output signal that corresponds to the position of the ferrofluid sensing elements.

In an alternative embodiment, the overlaid coils 48 or the sensing elements 50 are arranged along only one of the legs 18 or 22.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A liquid level monitoring system for monitoring the level of liquid in a storage tank, the system including:

A. a U-shaped tube with opposing first and second legs;

B. first pressure means for applying to the first leg a pressure which is proportional to the level of the liquid;

C. second pressure means for applying a predetermined pressure to the second leg;

D. a ferrofluid sensing element that moves within the U-shaped tube in response to differences in the pressures applied to the first and second legs;

E. a first inductance coil wound around the first leg and a second inductance coil wound around the second leg, the inductances of the coils varying as the ferrofluid sensing element moves within the U-shaped tube; and F. signal means for producing a signal associated with a difference in the inductances of the coils and indicative of the level of liquid in the storage tank.

2. The system of claim 1 further including:

G. a bubbler tube connected to the first pressure means, the bubbler tube extending downwardly into the storage tank, such that the pressure applied by the first pressure means to the first leg is directly proportional to the liquid level in the storage tank; and H. a pressure regulator connected to the second pressure means, the pressure regulator maintaining the predetermined pressure.

3. The system of claim 2, further including a throttle between the first and second pressure means, said throttle decoupling the two pressure means.

4. The system of claim 2 further including a storage tank control system that responds to the signal produced by the signal means and operates a liquid pump to force liquid into or out of the storage tank, as necessary.

5. The system of claim 4, wherein the storage tank control system further includes an alarm, the storage tank control system operating the alarm when the signal produced by the signal means is associated with a liquid level that exceeds or falls below a predetermined maximum level or predetermined minimum level, respectfully.

6. A liquid level monitoring system for sensing a level of liquid in a storage tank, the differential pressure sensing system including:

A. a U-shaped tube with opposing first and second legs;

B. a first pressure chamber connected to the first leg, the first pressure chamber applying a pressure to the first leg;

C. a second pressure chamber connected to the second leg, the second pressure chamber applying a pressure to the second leg;

D. a ferrofluid sensing element that moves within the U-shaped tube in response to differences in the pressures applied to the first and second legs;

E. a first inductance coil wound around the first leg and a second inductance coil wound around the second leg, the inductances of the first and second coils varying as the ferrofluid sensing element moves within the U-shaped tube;

F. a bubbler tube connected to the first pressure chamber, the bubbler tube extending into the storage tank such that the pressure in the first pressure chamber is directly proportional to the level of liquid in the storage tank;

G. a pressure regulator connected to the second pressure chamber, the pressure regulator maintaining the second pressure chamber at a selected, fixed pressure; and H. signal means for producing a signal associated with a difference in the inductances of the inductance coils, the signal being directly proportional to the level of liquid in the storage tank.

7. The differential pressure sensing system of claim 6 further including a storage tank control system that responds to the signal produced by the signal means and operates a liquid pump to force liquid into or out of the storage tank, as necessary.

8. The differential pressure sensing system of claim 7, wherein the pressure regulator is adjustable, to apply to the second pressure chamber a pressure that corresponds to a selected level of liquid in the storage tank.

9. A liquid level monitoring system for monitoring the level of liquid in a storage tank, the system including:

A. a U-shaped tube with opposing first and second legs;

B. first pressure means for applying to the first leg a pressure which is proportional to the level of the liquid;

C. second pressure means for applying a predetermined pressure to the second leg;

D. a ferrofluid sensing element that moves within the U-shaped tube in response to differences in the pressures applied to the first and second legs;

E. a plurality of inductance coils wound around the first leg of the U-shaped tube such that the coils overlap, the inductances of the coils varying as the ferrofluid sensing element moves within the U-shaped tube; and F. signal means for producing an output signal associated with a difference in the inductances of the coils and indicative of the level of liquid in the storage tank.

10. The monitoring system of claim 9 wherein the signal means includes:

i. means for applying an input signal to the inductance coils, the inductance coils producing in response thereto signals that vary with the position of the ferrofluid sensing element; and ii. a detector that receives signals produced by the inductance coils and encodes the signals to produce the output signal.

11. The monitoring system of claim 10, wherein the detector receives the input signal from the signal means and includes means for filtering out those of the signals received from the coils that are not the same phase as the input signal.

12. The system of claim 9 further including:

G. a bubbler tube connected to the first pressure means, the bubbler tube extending downwardly into the storage tank, such that the pressure applied by the first pressure means to the first leg is directly proportional to the liquid level in the storage tank; and a pressure regulator connected to the second pressure means, the pressure regulator maintaining the predetermined pressure.

13. The system of claim 12, further including a throttle between the first and second pressure means, said throttle decoupling the two pressure means.

14. The system of claim 12 further including a storage tank control system that responds to the signal produced by the signal means and operates a liquid pump to force liquid into or out of the storage tank, as necessary.

15. The system of claim 14, wherein the storage tank control system further includes an alarm, the storage tank control system operating the alarm when the signal produced by the signal means is associated with a liquid level that exceeds or falls below a predetermined maximum level or predetermined minimum level, respectfully.

16. A liquid level monitoring system for monitoring the level of liquid in a storage tank, the system including:

A. a U-shaped tube with opposing first and second legs;

B. first pressure means for applying to the first leg a pressure which is proportional to the level of the liquid;

C. second pressure means for applying a predetermined pressure to the second leg;

D. a ferrofluid sensing element that moves within the U-shaped tube in response to differences in the pressures applied to the first and second legs;

E. a plurality of sensing elements arranged contiguously along the first leg of the U-shaped tube, the sensing elements producing signals that vary as the ferrofluid sensing element moves within the U-shaped tube; and F. signal means for receiving signals produced by the sensing elements and producing an output signal indicative of the level of liquid in the storage tank.

17. The monitoring system of claim 16 further including a plurality of sensing elements arranged contiguously along the second leg of the U-shaped tube, these sensing elements producing signals that vary as the ferrofluid sensing element moves within the U-shaped tube and applying the signals to the signal means.

18. The monitoring system of claim 16 wherein the sensing elements are Hall effect sensing elements.

19. The monitoring system of claim 16 wherein the sensing elements are optical sensing elements.

20. The monitoring system of claim 17 wherein the sensing elements are elements whose capacitance varies with the position of the ferrofluid sensing element in the U-shaped tube.

21. The monitoring system of claim 16 wherein the signal means includes:

i. means for applying an input signal to the plurality of sensing elements, the elements producing in response thereto signals that vary with the position of the ferrofluid sensing element; and ii. a detector that receives signals produced by the plurality of sensing elements and encodes the signals to produce the output signal.

22. The monitoring system of claim 21, wherein the detector receives the input signal from the signal means and includes means for filtering out those of the signals received from the coils that are not the same frequency as the input signal.

23. The system of claim 16 further including:

G. a bubbler tube connected to the first pressure means, the bubbler tube extending downwardly into the storage tank, such that the pressure applied by the first pressure means to the first leg is directly proportional to the liquid level in the storage tank; and H. a pressure regulator connected to the second pressure means, the pressure regulator maintaining the predetermined pressure.

24. The system of claim 23, further including a throttle between the first and second pressure means, said throttle decoupling the two pressure means.

25. The system of claim 23 further including a storage tank control system that responds to the signal produced by the signal means and operates a liquid pump to force liquid into or out of the storage tank, as necessary.

26. The system of claim 25, wherein the storage tank control system further includes an alarm, the storage tank control system operating the alarm when the signal produced by the signal means is associated with a liquid level that exceeds or falls below a predetermined maximum level or predetermined minimum level, respectfully.

27. A liquid level monitoring system for monitoring the level of liquid in a storage tank, the system comprising:

a U-shaped tube having opposing first and second legs;

a first pressure chamber in communication with the first leg;

a second pressure chamber in communication with the second leg;

a connector pipe to connect the first pressure chamber and the second pressure chamber, the connector having a throttle to decouple the first and second pressure chambers;

an air pump to pressurize the first pressure chamber and the second pressure chamber, the air pump pressurizing the second pressure chamber through the throttle in the connector pipe;

a ferrofluid sensing element that moves within the U-shaped tube in response to differences in the pressures applied to the first and second legs;

a first inductance coil wound around the first leg and a second inductance coil wound around the second leg, the inductances of the coils varying as the ferrofluid sensing element moves within the U-shaped tube; and means for producing a signal associated with a difference in the inductances of the coils and being indicative of the level of liquid in the storage tank.

* * * * *